US010055155B2

(12) United States Patent
Sauks

(10) Patent No.: US 10,055,155 B2
(45) Date of Patent: Aug. 21, 2018

(54) SECURE SYSTEM ON CHIP

(71) Applicant: Wind River Systems, Inc., Alameda, CA (US)

(72) Inventor: Mati Sauks, Kanata (CA)

(73) Assignee: WIND RIVER SYSTEMS, INC., Alameda, CA (US)

( * ) Notice: Subject to any disclaimer, the term of this patent is extended or adjusted under 35 U.S.C. 154(b) by 112 days.

(21) Appl. No.: 15/167,269

(22) Filed: May 27, 2016

(65) Prior Publication Data

US 2017/0344261 A1    Nov. 30, 2017

(51) Int. Cl.

| G11C 29/00 | (2006.01) |
|---|---|
| G06F 3/06 | (2006.01) |
| G06F 12/0897 | (2016.01) |
| G06F 13/28 | (2006.01) |
| G06F 13/40 | (2006.01) |
| G06F 11/10 | (2006.01) |

(52) U.S. Cl.
CPC ............ *G06F 3/062* (2013.01); *G06F 3/0653* (2013.01); *G06F 3/0683* (2013.01); *G06F 11/1064* (2013.01); *G06F 12/0897* (2013.01); *G06F 13/28* (2013.01); *G06F 13/4068* (2013.01); *G06F 2212/1052* (2013.01)

(58) Field of Classification Search
CPC ...... G06F 3/062; G06F 3/0653; G06F 3/0683; G06F 11/1064; G06F 12/0897; G06F 13/28; G06F 13/4068; G06F 9/3828; G06F 9/5083; G06F 9/30134; G06F 12/1408; G06F 21/575; G06F 2221/032; G06F 2212/1052; G06F 3/0619; G11C 7/1075; G11C 29/52

See application file for complete search history.

(56) References Cited

U.S. PATENT DOCUMENTS

| 2008/0155321 A1* | 6/2008 | Riedlinger ............ G06F 1/3203 714/17 |
| 2011/0231616 A1* | 9/2011 | Lin ........................ G06F 9/3828 711/147 |
| 2014/0181618 A1* | 6/2014 | Wu ........................ H03M 13/11 714/761 |
| 2015/0278119 A1* | 10/2015 | Loh ...................... G06F 12/1408 713/193 |
| 2015/0293720 A1* | 10/2015 | Lam ...................... G06F 9/5016 711/147 |
| 2017/0199819 A1* | 7/2017 | Huang ................ G06F 12/0817 |

* cited by examiner

*Primary Examiner* — Guerrier Merant
(74) *Attorney, Agent, or Firm* — Fay Kaplun & Marcin, LLP

(57) ABSTRACT

A secure SoC IC is disclosed herein. In embodiments, a SoC IC for computing may comprise a plurality of processor cores, wherein each processor core has at least one level of private cache and its own private memory to securely execute one or more applications. Further, the SoC IC may include a plurality of isochronous memory disposed between selected pairs of the processor cores to provide deterministic data transfers between the processor core pairs. Other embodiments may be disclosed or claimed.

23 Claims, 3 Drawing Sheets

SECURE SYSTEM ON CHIP

TECHNICAL FIELD

The present disclosure relates to the field of computing. More specifically, the present disclosure is related to secure system on chip.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A system on a chip or system on chip (SoC) is an integrated circuit (IC) that integrates all components of a computer or other electronic system into a single IC. It may contain digital, analog, mixed-signal, and often radio-frequency functions—all on a single chip substrate. Over the years, SoCs have become widely accepted, and used in embedded systems, mobile devices, such as smartphones and tablets, and so forth. In recent years, like computing in general, there are increased concerns with, and requirements for computing security for embedded systems and mobile applications. However, current commodity SoCs are not designed to meet the ever increasing expectation on security.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
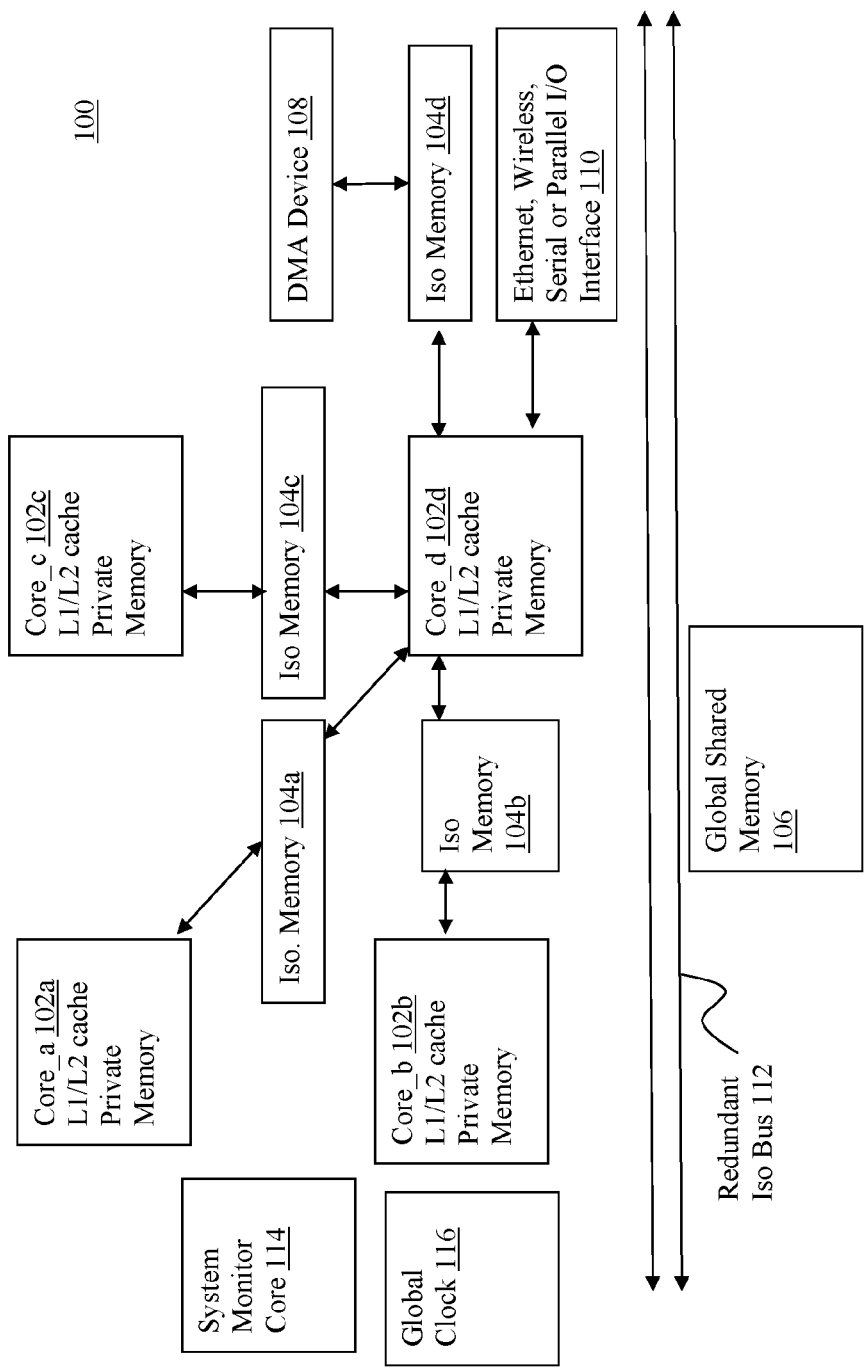
FIG. 1 illustrates a schematic view of the secure SoC IC of the present disclosure, in accordance with various embodiments.

A secure SoC IC is disclosed herein. In embodiments, a SoC IC for computing may comprise a plurality of processor cores, wherein each processor core may have at least one level of private cache and its own private memory to securely execute one or more applications. Further, the SoC IC may include a plurality of isochronous memory disposed between selected pairs of the processor cores to provide deterministic data transfers between the processor core pairs In embodiments, a SoC IC for computing may comprise a first, a second, a third and a fourth processor core, wherein each processor core has at least one level of private cache and its own private memory to securely execute one or more applications. Further, the SoC IC may include a first, a second, and a third isochronous memory disposed between, and respectively coupling the first, the second and the third processor core to the fourth processor core, to provide deterministic data transfers between the first, the second, and the third processor core, and the fourth processor core.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein a schematic view of the SoC IC of the present disclosure, in accordance with various embodiments, is shown. As illustrated, in embodiments, SoC IC 100 for computing may comprise a plurality of processor cores, e.g., Core_a through Core_d 102a-102d. Each processor core 102a-102d may have at least one level of private cache and its own private memory to securely execute one or more applications. Further, SoC IC 100 may include a plurality of isochronous memory 104a-104c disposed between selected pairs of the processor cores 102a-102d to provide deterministic data transfers between the processor core pairs.

More specifically, for the illustrated embodiments, isochronous memory 104a-104c are respectively disposed in between and coupling Core_a 102a, Core_b 102b and Core_c 102c to Core_d 102d to provide deterministic data transfers between Core_a 102a and Core_d 102d, Core_b 102b and Core_d 102d, and Core_c 102c and Core_d 102d.

Additionally, SoC IC 100 may include an Ethernet, Wireless, Serial and/or Parallel Input/Output (I/O) interface 110 to communicate with components outside SoC IC 100, i.e., to transmit data to, and receive data from components outside SoC IC 100. In other words, Core_a through Core_c 102a-102c are securely isolated from the world outside of SoC IC 100. All their data communication with components outside SoC IC 100 go through Core_d 102d. As a result, all applications executed by Core_a through Core_c 102a-102c are securely isolated from the world outside of SoC IC 100. For example, in a multiple network application, isolated cores Core_a through Core_$_c$ 102a-102c may be used to service/process interactions with other outside applications on three separate networks of three different levels of security, high, medium and low. Thus, a compromise on the low security network would not affect the security of the high and medium security networks.

Figure 2:
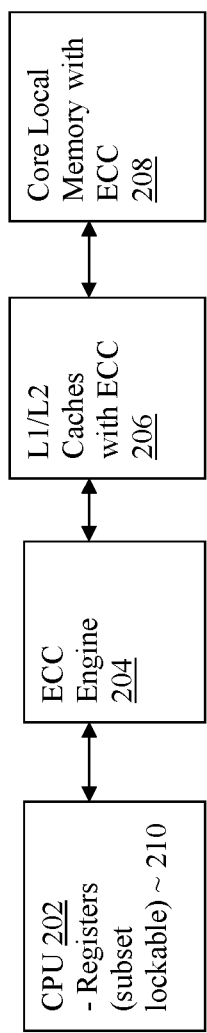
FIG. 2 illustrates a processor core in further detail, in accordance with various embodiments

FIG. 2 illustrates a processor core 200 in further detail, in accordance with various embodiments. Processor core 200 may be any one of Core_a through Core_d 102a-102d. As shown, processor core 200 may include a central processing unit (CPU) 202, error correcting codeword (ECC) engine 204, one or more level of private caches 206, and local private memory 208, coupled to each other as shown. Further, CPU 202 may include a number of registers 210, a subset of which may be lockable to secure data stored therein. In embodiments, there may be two levels of private cache 206, L1 and L2. CPU 202, private memory 208 and private cache 206 may be configured to perform their convention functions, i.e., execute instructions, store instructions and/or data, and cache the instructions and/or data stored in private memory 208. ECC engine 204 may be configured to perform ECC service for data stored in the lockable subset of registers 210, the at least one level of private cache 206 or private memory 208 of processor core 200. Further, in embodiments, each private cache 206 may be partitioned into at least two portions, with one portion configured to cache instructions, and another portion configured to cache data. Except for the manner they are architected to secure processor core 200, each of CPU 202, ECC engine 204, L1/L2 caches 206 and local memory 208 itself, may be any one of corresponding elements known in the art.

Referring back to FIG. 1, as shown, in embodiments, SoC IC 100 may further include a direct memory access (DMA) device 108, and another isochronous memory 104d disposed between and coupling DMA device 108 and processor Core_d 102d. Similar to isochronous memory 104a-104c, isochronous memory 104d may be configured to provide DMA device 108 with deterministic accesses to the private memory of processor Core_d 102d. Coupling DMA device 108 to processor Core_d 102d via isochronous memory 104d has the advantage of shielding the processor cycles of Core_d 102d from DMA accesses.

Before further describing SoC IC 100 and its components, it should be noted that while for ease of understanding, FIG. 1 illustrates SoC IC 100 as having four processor cores with all external I/O going through one processor core, and isochronous memory disposed between the I/O processor core and the other processor cores, the embodiments should not be read as so limiting on the present disclosure. In embodiments, a secure SoC IC 100 may have any plurality of processor cores, with all external I/O going through a small subset of processor cores, one, two etc., and isochronous memory disposed between the I/O processor core(s) and the other processor cores. For these embodiments, there may be additional Ethernet, Wireless, Serial and/or Parallel Input/Output (I/O) interfaces, one each, correspondingly coupled to the I/O processor cores to communicate with components outside SoC IC 100, i.e., to transmit data to, and receive data from components outside SoC IC 100. Similarly, there may be additional and/or DMA devices, one each, correspondingly coupled to the I/O processor cores, with isochronous memory disposed in between to facilitate deterministic DMA access to the coupled I/O processor core.

In embodiments, SoC IC 100 may further include global shared memory 106 and a plurality of redundant isochronous bus 112 coupling processor Core_a-Core_d 102a-102d and global shared memory 106. Redundant isochronous buses may be configured to provide deterministic accesses to global shared memory 106 by processor Core_a-Core_d 102a-102d.

In embodiments, SoC IC 100 may further include system monitor core 114 to perform system management services for SOC IC 100. System monitor core 114 may be coupled to and has access to all private memory and selected registers of the processor Core_a-Core_d 102a-102d. The system management services provided may include one or more of time validation of software, validation of a boot sequence, or monitor of the processor Core_a-Core_d 102a-102d.

In embodiments, SoC IC 100 may further include global clock 116, which global clock time may be available to processor Core_a-Core_d 102a-102d for synchronization. Additionally, global clock 116 may be configured to allow its global clock time to be synchronized with a clock time external to SOC IC 100.

Figure 3:
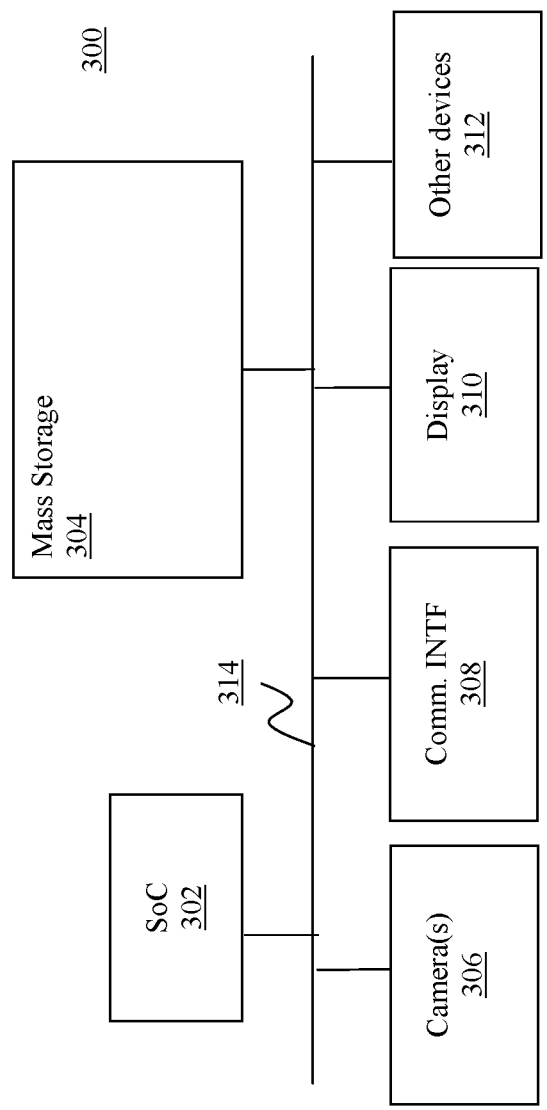
FIG. 3 illustrates an example computer system equipped with the SoC IC of the present disclosure, in accordance with various embodiments.

Referring now to FIG. 3, wherein an example computer system having the secure SoC IC of the present disclosure, in accordance with various embodiments, is illustrated. As shown, computer device 300 may include SoC IC 302 with multiple processor cores, each having private caches and private memory. SoC IC 302 may comport with earlier described SoC IC 100. Additionally, computer device 300 may include mass storage devices 304. Example of mass storage devices 306 may include, but are not limited to, any non-volatile persistent storage. Further, computer system 300 may include one or more cameras 306, communication interfaces 308 (such as wireless communication interfaces, 3G/4G, WiFi, Bluetooth®, Near Field Communication (NFC), and so forth), display 310 (such as a touch sensitive display) and other devices 312 (such as global positioning system (GPS), gyroscope, or other sensors). The elements 302-312 may be coupled to each other via system bus 314, which may represent one or more buses. In the case of multiple buses, they may be bridged by one or more bus bridges (not shown).

As earlier described, SoC IC 302 may provide secure execution of applications. Each of the other elements 304-314 may perform its conventional functions known in the art. Private memory of the processor cores of SoC IC 302 and mass storage device 304 may be employed to store a working copy and a permanent copy of the programming instructions of the various applications. The applications may be implemented in assembler or machine instructions supported by the processor cores of SoC IC 302, or high-level languages, such as, for example, C, that can be compiled into such assembler/machine instructions.

The number, capability and/or capacity of these elements 302-314 may vary, depending on the use of computer device 300, e.g., for an industrial application, or as a mobile device, such as a wearable device, a smartphone, a computer tablet, a laptop and so forth. Otherwise, SoC IC 302 may comport to earlier described SoC IC 100, and the constitutions of elements 304-314 are known, accordingly, will not be further described.

Thus, example secure SoC IC embodiments described may include:

Example 1 may be a system on chip (SOC) integrated circuit (IC) for computing, comprising: a first, second, third and fourth processor cores, wherein each processor core has at least one level of private cache and its own private memory to securely execute one or more applications; and a first, a second, and a third isochronous memory disposed between and respectively coupling the first, the second and the third processor core to the fourth processor core, to provide deterministic data transfers between the first, the second and the third processor core, and the fourth processor core.

Example 2 may be example 1, further comprising a direct memory access (DMA) device, and another isochronous memory disposed between and coupling the DMA device and the fourth processor core; wherein the another isochronous memory may provide the DMA device with deterministic accesses to the private memory of the fourth processor core.

Example 3 may be example 1 or 2, further comprising an Ethernet, wireless, serial or parallel input/output (I/O) interface coupled to the fourth processor core, wherein all inputs into or outputs from the SOC IC may be routed through the Ethernet, wireless, serial or parallel I/O interface and the fourth processor core.

Example 4 may be a system on chip (SOC) integrated circuit (IC) for computing, comprising: a plurality of processor cores, wherein each processor core has at least one level of private cache and its own private memory to securely execute one or more applications; and a plurality of isochronous memory disposed between selected pairs of the processor cores to provide deterministic data transfers between the processor core pairs.

Example 5 may be example 4, wherein the at least one level of private cache of each processor core may be physically indexed, or selectively lockable.

Example 6 may be example 4, wherein each processor core may have at least two levels of private cache; wherein the level 2 cache of each processor core may be partitioned into at least a code section and a data section.

Example 7 may be example 6, wherein the level 2 cache of each processor core may be flash invalidated, when the level cache 2 cache of each processor core needs to be invalidated.

Example 8 may be example 4, where each processor core may further comprise a plurality of programmable registers that may be lockable.

Example 9 may be example 8, wherein each processor core may further comprise an error correcting codeword (ECC) engine coupled to the lockable registers, the at least one level private cache or private memory of the processor core to perform ECC service for data stored in the lockable registers, the at least one level private cache or private memory of the processor core.

Example 10 may be example 4, further comprising global shared memory and a plurality of redundant isochronous bus coupling the plurality of processor cores and the global shared memory; wherein the redundant isochronous buses may provide deterministic accesses to the global shared memory by the plurality of processor cores.

Example 11 may be example 4, further comprising a direct memory access (DMA) device, and another isochronous memory disposed between and coupling the DMA device and one of the plurality of processor cores; wherein the another isochronous memory may provide the DMA device with deterministic accesses to the private memory of the one processor core.

Example 12 may be example 4, further comprising an Ethernet, wireless, serial or parallel input/output (I/O) interface coupled to one of the plurality of processor cores, wherein all inputs into or outputs from the SOC IC may be routed through the Ethernet, wireless, serial or parallel I/O interface and the one processor core.

Example 13 may be any one of examples 4-12, further comprising a system monitor core to perform system management services for the SOC IC; wherein the system monitor core may be coupled to and has access to all private memory and selected registers of the processor cores.

Example 14 may be example 13, wherein the system management services may include one or more of time validation of software, validation of a boot sequence, or monitor of the processor cores.

Example 15 may be any one of examples 4-12, further comprising a global clock which clock time may be available to all processor cores for synchronization; and wherein the global clock can be synchronized with a clock time external to the SOC IC.

Example 16 may be an apparatus for computing, comprising: a system on chip (SOC) integrated circuit (IC) having a plurality of processor cores, wherein each processor core has at least one level of private cache and its own private memory to securely execute one or more applications; and a plurality of isochronous memory disposed between selected pairs of the processor cores to provide deterministic data transfers between the processor core pairs; and a display.

Example 17 may be example 16, wherein the display may be a touch-sensitive display.

Example 18 may be example 16, further comprising a camera.

Example 19 may be example 16, further comprising one or more sensors.

Example 20 may be any one of examples 16-19, wherein the apparatus may be a selected one of a wearable computing device, a smartphone, a computing tablet or a laptop computer. Example 21 may be example 3, wherein the first, second, and third processor cores respectively host applications of a first, a second, and a third network of first, second and third different security levels.

Example 22 may be any one of examples 4-12, wherein a first and a second of the processor cores respectively host applications of a first and a second network of first and second different security levels.

Example 23 may be any one of examples 16-19, wherein a first and a second of the processor cores of the SOC IC respectively host applications of a first and a second network of first and second different security levels.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A system on chip (SOC) integrated circuit (IC) for computing, comprising:
   first, second, third and fourth processor cores, wherein each processor core has at least one level of private cache and its own private memory to execute one or more applications;
   a first, a second, and a third isochronous memory respectively disposed between and coupling the first, the second and the third processor cores to the fourth processor core, to provide deterministic data transfers between the first and the fourth processor cores, the second and the fourth processor cores, and the third and the fourth processor cores, such that the fourth processor core isolates the first, second and third processor cores from other devices on or off the SOC, and secures the execution of the one or more applications on the first, second and third processor cores.

2. The SOC IC of claim 1, further comprising a direct memory access (DMA) device, and another isochronous memory disposed between and coupling the DMA device to only the fourth processor core; wherein the another isochronous memory provides the DMA device with deterministic accesses to only the private memory of the fourth processor core.

3. The SOC IC of claim 1, further comprising an Ethernet, wireless, serial or parallel input/output (I/O) interface coupled only to the fourth processor core, wherein all inputs into or outputs from the SOC IC are routed through the Ethernet, wireless, serial or parallel I/O interface and only to the fourth processor core.

4. The SOC IC of claim 1, wherein the first, second, and third processor cores respectively host applications of a first, a second, and a third network of first, second and third different security levels.

5. A system on chip (SOC) integrated circuit (IC) for computing, comprising:
   a plurality of processor cores, wherein each processor core has at least one level of private cache and its own private memory to execute one or more applications; and
   a plurality of isochronous memory respectively disposed between a selected one of the plurality of processor cores, and remaining ones of the processor cores to provide deterministic data transfers between the selected one of the plurality of processor cores, and the remaining ones of processor core pairs, such that the selected one of the processor cores isolates the remaining ones of processor cores from other devices on or off the SOC, and secures the execution of the one or more applications on the remaining ones of the processor cores.

6. The SOC IC of claim 5, wherein the at least one level of private cache of each processor core is physically indexed, or selectively lockable.

7. The SOC IC of claim 5, wherein each processor core has at least two levels of private cache; wherein the level 2 cache of each processor core is partitioned into at least a code section and a data section.

8. The SOC IC of claim 5, wherein the level 2 cache of each processor core is flash invalidated, when the level cache 2 cache of each processor core needs to be invalidated.

9. The SOC IC of claim 5, where each processor core further comprises a plurality of programmable registers that are lockable.

10. The SOC IC of claim 9, wherein each processor core further comprises an error correcting codeword (ECC) engine coupled to the lockable registers, the at least one level of private cache or private memory of the processor core to perform ECC service for data stored in the lockable registers, the at least one level of private cache or private memory of the processor core.

11. The SOC IC of claim 5, further comprising global shared memory and a plurality of redundant isochronous buses coupling the plurality of processor cores and the global shared memory; wherein the redundant isochronous buses are to provide deterministic accesses to the global shared memory by the plurality of processor cores.

12. The SOC IC of claim 5, further comprising a direct memory access (DMA) device, and another isochronous memory disposed between and coupling the DMA device to only the selected one of the plurality of processor cores; wherein the another isochronous memory provides the DMA device with deterministic accesses to only the private memory of the selected one of the processor cores.

13. The SOC IC of claim 5, further comprising an Ethernet, wireless, serial or parallel input/output (I/O) interface coupled to the selected one of the plurality of processor cores, wherein all inputs into or outputs from the SOC IC are routed through the Ethernet, wireless, serial or parallel I/O interface and only to the selected one of the processor cores.

14. The SOC IC of claim 5, further comprising a system monitor core to perform system management services for the SOC IC; wherein the system monitor core is coupled to and has access to all private memory and selected registers of the processor cores.

15. The SOC IC of claim 14, wherein the system management services include one or more of time validation of software, validation of a boot sequence, or monitor of the processor cores.

16. The SOC IC of claim 5, further comprising a global clock with clock time that is available to all processor cores for synchronization; and wherein the global clock can be synchronized with a clock time external to the SOC IC.

17. The SOC IC of claim 5, wherein a first and a second of the remaining ones of the processor cores respectively host applications of a first and a second network of first and second different security levels.

18. An apparatus for computing, comprising:
   a system on chip (SOC) integrated circuit (IC) having
      a plurality of processor cores, wherein each processor core has at least one level of private cache and its own private memory to execute one or more applications; and
      a plurality of isochronous memory respectively disposed between a selected one of the processor cores and remaining ones of the processor cores to provide deterministic data transfers between the selected one of the processor cores and the remaining ones of processor core pairs, such that the selected one of the processor cores isolates the remaining ones of processor cores from other devices on or off the SOC, and secures the execution of the one or more applications on the remaining ones of the processor cores; and
   a display.

19. The apparatus of claim 18, wherein the display is a touch-sensitive display.

20. The apparatus of claim 18, further comprising a camera.

21. The apparatus of claim 18, further comprising one or more sensors.

22. The apparatus of claim 18, wherein the apparatus is a selected one of a wearable computing device, a smartphone, a computing tablet or a laptop computer.

23. The apparatus of claim 18, wherein a first and a second of the remaining ones of the processor cores of the SOC IC respectively host applications of a first and a second network of first and second different security levels.

* * * * *

UNITED STATES PATENT AND TRADEMARK OFFICE
CERTIFICATE OF CORRECTION

PATENT NO. : 10,055,155 B2  
APPLICATION NO. : 15/167269  
DATED : August 21, 2018  
INVENTOR(S) : Sauks et al.

Page 1 of 1

It is certified that error appears in the above-identified patent and that said Letters Patent is hereby corrected as shown below:

In the Claims

Claim 8 Line 62, delete "cache 2 cache of each processor core needs to be invalidated." and insert --2 cache of each processor core needs to be invalidated.--

Signed and Sealed this
Fourth Day of June, 2019

Andrei Iancu
*Director of the United States Patent and Trademark Office*